Feb. 9, 1954
C. B. PIERCE
2,668,525
LUBRICATING DEVICE FOR INTERNAL-COMBUSTION ENGINES
Filed June 18, 1952
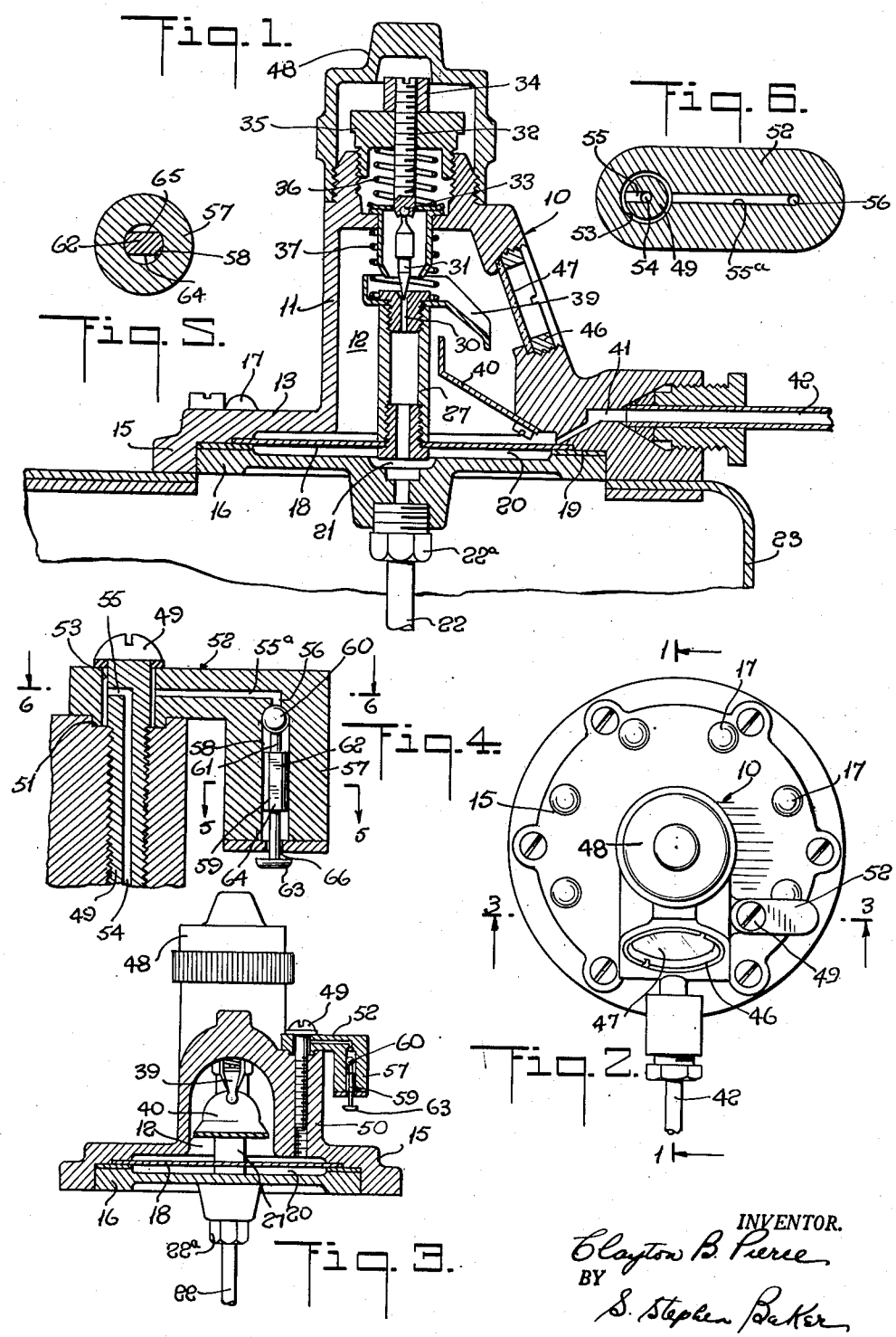
INVENTOR.
Clayton B. Pierce
BY
S. Stephen Baker
ATTORNEY Patented Feb. 9, 1954

2,668,525

UNITED STATES PATENT OFFICE 2,668,525

LUBRICATING DEVICE FOR INTERNAL-COMBUSTION ENGINES

Clayton B. Pierce, Port Chester, N. Y., assignor to Emerol Manufacturing Co., Inc., New York, N. Y., a corporation of Illinois Application June 18, 1952, Serial No. 294,141

9 Claims. (Cl. 123—196)

1

This invention relates to a lubricating device for internal combustion engines and more particularly to such a device which feeds lubricant material to the combustion chambers of the engine in accordance with the specific operating requirements.

The invention is an improvement on lubricating systems of the type shown in United States Patents Nos. 1,883,110 and 2,558,979. As disclosed in these patents, lubricating systems of this nature include the provision of a movable diaphragm which is acted upon by a vacuum existing in the manifold of the internal combustion engine so as to automatically adjust the opening of a needle valve and thereby control the quantity of lubricant delivered to the upper cylinders or combustion chambers of the engine through the valve opening. The device is arranged to thereby increase the effective size of the valve opening when the engine is running under a greater load so as to correspondingly increase the passage of lubricant to the engine. Conversely, the effective valve opening is decreased when the engine is idling and the passage of lubricant being delivered is limited accordingly. Thus, the system serves to supply an amount of lubricant governed by the operating load of the engine.

It has always been desirable to make the delivery of lubricant directly proportional to the operating load of the engine. Thus, when the engine was idling, about three or four drops per minute would flow through the lubricating device into the combustion chambers and when the vehicle, for example, was travelling at a high speed, it was desirable that about 40 to 60 drops flow per minute with preference toward the high figure. In other words, if approximately 60 drops would flow per minute, there would be greater assurance of adequate lubricant protection for the engine. Of course, intermediate loads would draw intermediate amounts of lubricant.

It has been found in actual practice that the amount of lubricant drawn was not proportional to the engine load particularly at higher loads or speeds. Thus, assuming that 40 drops per minute might flow at a particularly high vehicle speed, if the speed were increased further, it was found that the flow did not increase correspondingly and even exhibited a downward course in spite of the increased load. The art has long sought the correction of this operative defect and the present invention is particularly directed thereto.

It has long been recognized that inasmuch as a lubricating device of the type under discussion operates by means of vacuum to draw lubricant from a source of supply thereof, that some means must be taken to vent the vacuum chamber in the absence of a positive suction provided by the manifold of the engine. The reason therefor is that when the vacuum or suction ceases, the system nevertheless would continue to draw lubricant through a siphoning action. For example, it is well known that if one draws a fluid through a tube by suction, the flow may continue after suction has stopped. This will produce a siphoning of the fluid.

In respect to lubricating devices of the instant type, this problem had heretofore been met by introducing a minute vent in the vacuum chamber of the device. The vacuum drew the lubricant as required notwithstanding the presence of the vent because the vent was extremely small and apparently did not unduly interfere with proper action. However, I have determined that it is the vent which has disturbed the proper proportioning of lubricant flow because the vacuum available at high engine loads is very small and the size of the vent, being constant, acts disproportionately to interfere with proper lubricant flow. In other words, the vent was relatively ineffective at low speeds or loads when a high vacuum was available but it took increasing effect when a low vacuum was available. Furthermore, it is at that very time that lubricant is principally required because lubricant is most important at the higher load operations.

Bearing the foregoing in mind, I have provided a lubricating device wherein the vent is effectively eliminated by the very suction which delivers the lubricant to the combustion chambers but which is automatically restored when the vacuum produced by the engine ceases, as when the engine stops operation. Accordingly, the vent does not affect the delivery of lubricant at all and it has been found possible to draw over 60 drops per minute in a conventional internal combustion engine of an automobile.

The instant invention comprises a valve which communicates with the suction chamber of the lubricating device so that it is acted upon by the suction. The valve head is automatically pulled up by suction to close the opening and, when the suction ceases, the valve drops by the action of gravity and restores the vent through which the suction chamber may draw air instead of siphoning the fluid lubricant from the source of supply.

The invention will be further understood from the following description and drawings in which:

Figure 1 is a vertical cross-section of the lubricating device as taken along the lines 1—1 of Figure 2;

Figure 2 is a top plan view thereof on a reduced scale;

Figure 3 is a cross-sectional view taken along the lines 3—3 of Figure 2;

Figure 4 is a fragmentary cross-sectional view of the automatic valve element of the instant invention;

Figure 5 is a cross-sectional view taken along the lines 5—5 of Figure 4; and

Figure 6 is a cross-sectional view taken along the lines 6—6 of Figure 4.

Although the invention takes the form of a novel modification of a lubricating device as above described, it is believed desirable to briefly describe the general construction of the lubricating device as a whole in order to clarify the relation of the improvement thereto.

The lubricating device comprises a casing or housing 10 having a substantially tubular wall 11 defining a vacuum chamber 12 which in the present instance is substantially air-tight in operation as opposed to prior devices which included an air vent. Wall 11 is formed with a perpendicular base 13 which is provided with a depending flange 15. Flange 15 is adapted to embrace and enclose floor 16 which is secured therein by screws, not shown, which are received into the nuts 17. Secured between the marginal edge of floor 16 and base 13 is a circular diaphragm 18 tightly maintained therebetween at its marginal edge and provided with a gasket 19. Floor 16 is formed with an annular depression so as to provide a narrow chamber 20 on the underside of diaphragm 18. Thus, diaphragm 18 operates between the chambers 12 and 20 as hereinafter described. An opening 21 is formed centrally of floor 16 and serves to receive a conduit 22 through the medium of adapter nut 22a. Conduit 22 communicates with a source of lubricant oil supply maintained within container or reservoir 23.

It will be understood that diaphragm 18 is adapted to be acted upon by the suction in the manifold of an internal combustion engine to which the device is applied so as to control the size of a valve opening through which the lubricant flows to the engine cylinders. Thus, diaphragm 18 is connected to hollow stem 27 carrying a valve seat or opening 30. Valve seat 30 cooperates with a needle valve 31 in order to determine the size of the valve opening as will be evident.

Means are provided to predetermine the normal relationship of needle valve 31 with its valve seat 30. Such means comprise a screw 32 supporting the valve 31 through a universal joint 33. Screw 32 is threadedly received within the adjusting nuts 34 and 35. It will be evident that rotation of either nut 34 or 35 will vary the longitudinal position of valve 31 accordingly. Coil springs 36 and 37 stabilize the predetermined relationship of the parts.

As the suction applied to the device draws up lubricant from container 23 through conduit 22 and hollow stem 27, the lubricant is received on the feed spoon 39 from whence it drops on the pan 40. The lubricant thereafter is drawn through orifice 41 into the conduit 42. A ring screw 46 provided with a glass window 47 permits a view of the interior of chamber 12 so that the amount of lubricant oil dropping from spoon 39 onto pan 40 may be observed. If it is desired to make an adjustment of such amount, the nuts 34 and 35 may be actuated pursuant to the observed flow of lubricant during the operation of the engine. A cap 48 may be unscrewed and replaced as desired.

The other end of conduit 42 is connected to the intake manifold of the engine between the intake valves of the engine and the throttle valve of the carburetor. In this manner, the upper chamber 12 is subjected to the suction in the intake manifold so as to actuate the flexible diaphragm 18, such actuation taking place between the upper or extended chamber 12 and the relatively shallow chamber 20. It will be recognized that as the diaphragm is drawn toward the needle valve 31, the size of the valve opening decreases to reduce the amount of lubricant drawn from the source of supply to the combustion chambers and valves of the engine. The operation of the device is such as to form a larger opening of the valve means when the engine is operating under high load conditions and reduce the size of the opening during low load operation.

In producing the device, it was heretofore necessary to provide an air vent in the chamber 12. As above set forth, the reason therefore was that a siphoning action tended to occur even when the suction ceased. Oil would thus be drawn up through the conduit 22 and stem 27 and would flood the device. However, as above set forth, the air vent, while accomplishing its purpose of preventing siphoning, produced an undesirable effect at high load conditions. Thus, the flow at such conditions was generally insufficient and erratic.

In order to remedy the above difficulties, I have employed a boss 50 which is in itself similar of identical to that of my above mentioned Patent No. 2,558,979. Boss 50 is hollow and internally threaded and it communicates with chamber 12 at its lower end. It is formed with an annular depression at its upper end in order to seat the annular flange 51 of an inverted L-shaped valve housing 52 which serves as an air inlet member for dissipating any residual vacuum as will hereinafter be described. The horizontal arm of L-shaped housing 52 is formed with an annular vertical opening 53 which becomes axially aligned with the bore of boss 50 when the flange 52 is seated at its upper end.

A threaded bolt 49 is received into the threaded bore or hollow of boss 50 through the opening 53 of housing 42. Threaded bolt 49 is itself hollow having an air passage 54 formed centrally thereof. Air passage 54 has a lateral extension 55 which communicates with opening 53. It will be observed that the diameter of opening 53 is greater than the diameter of the upper portion of the shank of bolt 49 so as to provide an annular air space around said upper portion of said shank.

The horizontal arm of valve housing 52 is formed with a horizontal bore or elongated opening 55a which communicates with the opening 53. Opening 55a is formed with a downwardly extending portion 56 which forms a valve seat. The vertical arm 57 of valve housing 52 is provided with a vertical cylinder 58 in which the valve 59 is disposed and operates.

Valve 59 is formed with a ball head 60 which seats against the lower portion of opening extension 56. The stem 61 of valve 59 has a weight 62 disposed centrally thereof. The base of the stem is enlarged at 63 to provide a finger hold member. As illustrated in Figure 5, the weight 62 has the sides thereof cut away at 64 and 65 to permit the passage of air from valve housing opening 66 through cylinder 58 and through openings 56, 55a, 53 and 54 into the chamber 12.

The instant invention is practiced as follows:

When the engine or the like is in operation with the lubricating device attached thereto, the suction will be applied through conduit 42 as above described and lubricant oil will be drawn up from the container 23. Inasmuch as a suction exists in the chamber 12, the valve 59 will be drawn upwardly through the same suction, said suction being applied through the openings 54, 55, 55a and 56 and the cylinder 58. The head 60 of the valve 59 will be drawn up against the valve opening 56 by the difference in fluid pressure, the greater pressure, being of course, applied from the outside atmosphere through opening 66.

At the commencement of suction during operation of the engine, air will be caused to rush in through opening 66, will flow through cylinder 58 and will bear against the underside of head 60 so as to lift the valve and close the opening or valve seat 56. Accordingly, when the suction from the engine is applied to the lubricating device, there will be no air vent since the suction itself will have closed such vent. On the other hand, when the engine stops and the suction ceases, the valve 59 will drop by the action of gravity since the difference in fluid pressure is then sufficiently neutralized. Any siphoning action will thus be prevented because any suction in the chamber 12 will be dissipated through the series of openings hereinabove described and will not operate to continue to draw lubricant oil.

The foregoing structure has produced a pronounced improvement in operation. It is found that the reduced vacuum of high load operation, as it approaches as low as five inches of mercury, is not accompanied by an erratic feed. On the contrary, it was found that approximately 40 drops of lubricant oil flowed at such pressure and as the vacuum became less, the flow continued to increase substantially proportionately. As the vacuum fell to the order of one or two inches of mercury, such vacuum was still sufficient to maintain the valve 59 in place and as much as sixty drops per minute flowed through the device. Accordingly, it will be recognized that the operation was highly satisfactory in relation to the problem which had existed. When the suction stopped completely the valve 59 dropped by the action of gravity as was hereinabove described. On the other hand, any resumption of suction restored the valve to closing condition.

In addition to the advantages afforded by the above operation, the valve 59 may serve yet another purpose. Thus, as was pointed out in my prior Patent No. 2,558,979, it is often necessary to adjust the valve opening in order to maintain the proper flow under substantially all conditions. The adjustment should be made while the engine is running in order to be accurate. It is obviously very difficult or impossible for an operator to adjust a device under the hood of an automobile while he is driving the vehicle. However, it will be recalled that a condition of high load operation produces a low vacuum and vice versa. This fact enables the operator to use the described improvement for testing and adjusting purposes.

In preparing for such adjustment, the operator may idle the engine while the vehicle is standing still. This produces a high vacuum which pulls the valve 59 up against its seat. However, the operator may grasp member 63 and pull the valve 59 downwardly during such idling. This will obviously dissipate the high vacuum in chamber 12. The diaphragm 18 being thereby relaxed, the needle valve opening will be increased and a greater quantity of oil will flow. Thus, the manual displacement of valve 59 simulates high speed driving conditions in that it makes possible the production of substantially the same vacuum at idling speed as would be produced during high speed operation.

When an operator displaces valve 59 in order to make such adjustment, he need then merely turn nut 35 until he observes that oil is dropping at a rate of 40 to 60 drops per minute. He then releases valve 59 so as to restore the device to its normal operating state when suction is applied. Inasmuch as the engine is now idling, the diaphragm 18 will be drawn upwardly so as to reduce the flow. In this manner, the adjustment is considerably simplified and may be an in situ adjustment as opposed to a factory adjustment which might thereafter prove to be unsatisfactory when installed in a vehicle. Further details of the adjustment action, if desired, can be found in my above mentioned prior Patent No. 2,558,979.

While I have illustrated and described the disposition of the valve housing 52 on boss 50, it will be evident that valve housing or its equivalent may be disposed anywhere on the device where it will be subjected to the vacuum. For example, inasmuch as the vacuum is applied through conduit 42, which communicates with vacuum chamber 12, the valve may be disposed in or on the conduit 42 as will be evident. Thus, it is merely necessary to suspend a vertical arm such as 57 with a vertical cylinder such as 58 from the conduit, the cylinder communicating with the interior of the conduit. Vacuum from the conduit causes the valve to pull up into vent closing position and in the absence of vacuum, it drops.

What is claimed is:

1. In a lubricating device including a vacuum actuated diaphragm and feed valve in the interior of the device for feeding lubricant to the cylinders of an internal combustion engine in accordance with the vacuum produced by the operation of said engine, means to dissipate any residual vacuum in the interior of the device when the engine ceases operation, said means comprising an air inlet member having an inlet opening formed therethrough which communicates with the interior of the device, and an air valve in said opening, said air valve being adapted to be actuated into closing position by the action of the operating engine and to be released into opening position when the engine ceases operation whereby said air inlet opening is cut off from the outside atmosphere during engine operation and is restored thereto when the engine stops operation, said air inlet member including a vertical cylinder in which said air valve operates, said vertical cylinder communicating with the interior of the device so as to be subjected to the vacuum conditions therein, one end of said cylinder communicating with the atmosphere so that said valve may be actuated by the vacuum of the interior of the device to closing position, said air valve being actuated by gravity to uncover said opening when the vacuum produced by the operating engine ceases so as to permit air to be drawn through said inlet opening and into the interior of the device.

2. In a lubricating device including a vacuum actuated diaphragm and feed valve in the interior of the device for feeding lubricant to the cylinders of an internal combustion engine in accordance with the vacuum produced by the operation of said engine, means to dissipate any residual vacuum in the interior of the device when the engine ceases operation, said means comprising an air inlet member having an air inlet opening formed therethrough which communicates with the interior of the device, so as to be subjected to the internal vacuum conditions thereof and an air valve in said opening, a vertical cylinder in said air inlet member and communicating with said air inlet opening at one end and with the atmosphere at the other end and in which said air valve operates vertically, said air valve being adapted to be drawn up in said cylinder by the vacuum produced by the operating engine so as to seat itself against and close said air inlet opening whereby cessation of said engine operation vacuum causes said air valve to drop through gravity and expose said opening to the outside atmosphere.

3. Apparatus according to claim 2 and wherein said air inlet member comprises an inverted L-shaped member and wherein said cylinder is formed in the vertical arm of the L, said air valve comprising a stem, a head on the top end thereof, and a weight on said stem for urging the valve downwardly by gravitational action in the absence of vacuum being produced by the operating engine.

4. Apparatus according to claim 3 and including a finger hold member on the bottom end of said stem, said finger hold member extending through said vertical arm so as to be externally accessible.

5. A lubricating device for attachment to an internal combustion engine so as to feed lubricant oil thereto from a source of supply, said device comprising a vacuum chamber and a diaphragm operative therein for actuation by the vacuum present in the intake manifold of the engine when running, valve means connected to said diaphragm for producing a larger opening when the engine is operating under load, and a smaller opening when the engine is idling whereby oil from said source of supply may be fed through an opening of a size commensurate with the speed of the engine and determined by the degree of vacuum produced by the engine, and means to dissipate any residual vacuum in said chamber when the engine stops operation, said last named means comprising an air inlet member connected to said device, said member being formed with an air passage communicating with the interior of said chamber and normally communicating with the outside atmosphere, and a valve in said passage and adapted to be acted upon by vacuum being produced by the operation of the engine for closing said passage from the outside atmosphere, and opening said passage thereto in the absence of such operating vacuum, said vacuum chamber being substantially airtight, said air inlet member being formed with a cylinder which communicates at one end thereof with said air passage, the other end of said cylinder being exposed to the outside atmosphere, said valve being disposed in said cylinder so as to be actuated by vacuum in said chamber which is being produced by the engine, actuation of said valve by said vacuum being operative to close off said air passage from the outside atmosphere.

6. A device according to claim 5 and wherein said cylinder is vertical, said valve being disposed for vertical actuation therein by said vacuum, said valve being free in said cylinder whereby it may fall by the action of gravity in the absence of said vacuum and open said air passage to the outside atmosphere.

7. A device according to claim 6 and wherein said air inlet member is of inverted L-shape, said cylinder being formed in the vertical arm of said air inlet member, and said valve comprising a stem, a head on the upper end of said stem for closing said air passage and a weight on said stem for assisting in the gravitational downward action of said valve in the absence of said vacuum.

8. A device according to claim 7 and including a hollow threaded bolt screwed into said chamber, the other arm of said air inlet member having a vertical opening formed therein which communicates with said air passage, said bolt traversing through said vertical opening and the hollow of said bolt communicating with said vertical opening, said bolt securing said air inlet member to said device.

9. A device according to claim 8 and wherein said air valve weight is substantially round in cross-section and having cut away sides for permitting the passage of air to act upon the underside of the valve head, and a finger hold member on the lower end of said stem for permitting manual retraction of said air valve downwardly against the action of the vacuum produced by the operating engine.

CLAYTON B. PIERCE.

References Cited in the file of this patent

UNITED STATES PATENTS

| Number | Name | Date |
|---|---|---|
| 925,330 | Graham | June 15, 1909 |
| 2,539,924 | Pierce | Jan. 30, 1951 |

FOREIGN PATENTS

| Number | Country | Date |
|---|---|---|
| 884,998 | France | May 17, 1943 |